(12) United States Patent
Lindgren

(10) Patent No.: US 6,622,418 B2
(45) Date of Patent: Sep. 23, 2003

(54) LONG LINE FISHING REEL AND AUXILIARY HAULER

(76) Inventor: Peter B. Lindgren, 2499 SE. 8th St., Pompano, FL (US) 33062

( * ) Notice: Subject to any disclaimer, the term of this patent is extended or adjusted under 35 U.S.C. 154(b) by 0 days.

(21) Appl. No.: 10/020,053

(22) Filed: Dec. 13, 2001

(65) Prior Publication Data

US 2003/0110677 A1 Jun. 19, 2003

(51) Int. Cl.[7] .......................... A01K 91/18; A01K 79/00
(52) U.S. Cl. ........................ 43/6.5; 43/27.4; 242/608.5; 242/609
(58) Field of Search ................ 43/4, 6.5, 27.4; 242/608.5, 609, 609.4, 609.1

(56) References Cited

U.S. PATENT DOCUMENTS

| | | | | |
|---|---|---|---|---|
| 2,299,532 A | * | 10/1942 | Cronk et al. | 242/609.1 |
| 2,585,159 A | * | 2/1952 | Morley | 242/609.1 |
| 3,565,363 A | * | 2/1971 | Mizuguchi et al. | 242/609.1 |
| 4,083,450 A | * | 4/1978 | La Mar | 242/608.5 |
| 4,505,062 A | | 3/1985 | Cook, Jr. | 43/6.5 |
| 4,867,391 A | * | 9/1989 | Resch | 242/609.1 |
| 4,920,680 A | | 5/1990 | Lindgren | 43/6.5 |
| 5,154,016 A | * | 10/1992 | Fedora et al. | 43/4 |
| 5,317,830 A | * | 6/1994 | Jonsson | 43/27.4 |
| 5,575,437 A | * | 11/1996 | Campbell | 242/609.1 |
| 5,690,300 A | | 11/1997 | Iannucci | 242/571.2 |
| 5,743,486 A | * | 4/1998 | Bulman | 242/608.5 |
| 5,868,348 A | * | 2/1999 | Bulman | 242/608.5 |
| 6,199,786 B1 | * | 3/2001 | Lessard et al. | 242/608.5 |
| 6,241,181 B1 | * | 6/2001 | Campbell | 242/609 |
| 6,460,796 B1 | * | 10/2002 | Berning et al. | 242/609.4 |
| 6,497,381 B2 | * | 12/2002 | Rose | 242/609.1 |
| 6,517,023 B2 | * | 2/2003 | Rodriguez | 242/609.1 |

FOREIGN PATENT DOCUMENTS

| | | | |
|---|---|---|---|
| DE | 2420994 B1 | * 11/1974 | 43/4 |
| WO | WO 00/70948 A1 | * 11/2000 | |
| WO | WO 01/72118 A1 | * 10/2001 | |

* cited by examiner

Primary Examiner—Darren W. Ark
(74) Attorney, Agent, or Firm—McHale & Slavin, P.A.

(57) ABSTRACT

A longline fishing system which is attached to a fishing boat for the purpose of lessening wear and ear on the fishing line has an improved reel and an auxiliary hauler. The reel is made from a plurality of arcuate sections forming a core. End plates are attached to each end of the core. The diameter of the core and the diameter of the end plates are related to prevent over stressing the line. The auxiliary hauler is placed between the stern and the reel to accept a portion of the hauling load.

10 Claims, 4 Drawing Sheets

LONG LINE FISHING REEL AND AUXILIARY HAULER

FIELD OF THE INVENTION

This invention relates generally to the field of fishing and, more particularly, to an improvement in reels/spools used for long line fishing.

BACKGROUND OF THE INVENTION

Long line fishing is an effective form of fishing that typically deploys miles of monofilament line supported horizontally in the water column from floats with hundreds of hooks for palegic species or deployed on the bottom of the ocean for demersal species.

Originally these long lines were made from rope set and hauled, by hand, from small boats. Pincher type power driven haulers made larger systems feasible for larger vessels. The rope was usually stored in large tubs. Later, some mid-size boat fleets found it preferable to haul and store rope lines on large hydraulic driven reels eliminating the need for a pincher hauler and the storage tubs.

In the 1970's, some fishermen started using large monofilament for the main lines instead of ropes. They found that it fished better but, because of it's stretch, it put high compression loads on the storage spools and did not lend itself to the use of current pincher type haulers. Better spools were designed that could withstand the more demanding loads accumulated from the stretched monofilament. Monofilament long lining systems expanded steadily for the mid-sized fleets of 12 to 30 meters in length.

In the 1990's, monofilament long line gear was beginning to penetrate more demanding markets of larger boats. These boats may exceed 60 meters and have crews capable of setting and hauling 70 or 80 miles per day of fishing line. The hauling and setting speeds required pushed monofilament and storage spool demands beyond existing technology. Storage spool limitations of 50 miles per spool required 2 spools per vessel and monofilament line, considered a durable product capable of lasting for years, was being changed every few months. The use of monofilament long line systems is still growing because of it's lower crew requirement and better fishing ability than any other known long line fishing technique.

However, a clear need for improvement in spool and monofilament technology is apparent. The limit on long line spool capacity is stress on the storage spool and the line. Conventionally, the storage spools are manufactured from aluminum or steel. They have a center cylindrical section with an axle journal secured thereto, with reinforcing ribs, welded near the cylinder ends to form the spool. The spool is mounted on a frame with a hydraulic drive motor and line level winder. The cylinder sizes may be 10 to 16 inches in diameter with end plate flanges typically from 36 to 48 inches in diameter. Distance between the flanges would be from 48 to 96 inches. These dimensions produce a long line reel that is relatively efficient to build with high strength, good capacity, and reasonable cost.

PRIOR ART

U.S. Pat. No. 4,505,062 to Cook, Jr. teaches a longline hauling V-grooved sheave and storage system with transverse rollers angled to the line direction located between the reel and the storage tub.

Lingren, U.S. Pat. No. 4,920,680, teaches a drive circuit for longline reels that maintains tension on the line as it is wound on the reel.

Iannucci, U.S. Pat. No. 5,690,300, teaches a spool having a central shaft composed of arcuate sections linked together.

What is needed in the art is a device that addresses monofilament hydraulic hauling and storage spool problems including monofilament deterioration problem. In addition, what is needed is a method of manufacturing spools to address various spool manufacturing problems.

SUMMARY OF THE INVENTION

The larger vessels, now using long lines, have placed greater demands on the conventional spools. These vessels are capable of carrying more line, staying out for longer periods of time, and capturing high amounts of fish than previous found on smaller vessels. Hauling speeds that were 7 knots are now, often 10 or 11 knots. Poor handling of larger boats and rougher fishing conditions contribute to higher line hauling loads.

The line often comes off the spool deformed oval or, even, it flat from the enormous pressure at or near the bottom of the spool. The pressure at the core of the reel can be estimated from the formula:

$$\text{PSI} = \frac{\text{(hauling load force)(spool max. dia. Minus spool min. dia.)}}{2C \text{ (line dia. Squared)(spool min. dia.)}}$$

Where $C$ is a constant expressing Nylon creep from 0 to 1

The line strain is then a resultant of the hauling strain plus (+) the strain created by the accumulating spool wraps as calculated at the bottom by the above formula.

Plastics, by definition, have deformation from load that is permanent at high loads over time. For many conditions this is easily predicted by calculating the creep, as reported for the specific plastic, being used. The actual loads for hauling a long line vary constantly. These conditions and the creep and deterioration properties of highly molecularly oriented Nylon lines, as stored on long line reels, is previously unstudied.

Laboratory tests which reduce monofilament line to the condition of samples of monofilament line, deteriorated only a few months in actual fishing conditions, have been conducted with instrumentation to obtain certain data. The result is an invention that has unanticipated proportions and requirements that can be designed with a simple algorithm to solve the current long line reel problems.

For example, monofilament fishing reels that are fished with very high hauling loads for high capacity often find that the monofilament is permanently damaged. Actual line test of 3.6mm monofilament of 1000 lb. tensile strength show a deterioration to less than 600 lb. Overhand knot strength has deteriorated from 650 lb. to 350 lb., respectively. Under conventional monofilament long line use, such line has been documented to deteriorate from 10% to 25% over 1 to 6 years of normal use.

Further the monofilament line does not work well in traditional hauling devices that pinch the line in a V groove between closely spaced cheeks to gain friction on the line.

Currently, loads on monofilament during hauling can be as high as 25,000 psi. Additional pressure at the lower inside diameter of the storage reel can be in excess of 10,000 psi. These loads are constant as long as the line is on the storage reel. While fishing, this is approximately 10% to 50% of the time for 200–250 days per year. When a vessel is not fishing, the line is under this stress 100% of the time.

However, using the higher parameters of current usage, Nylon 6-6/6 copolymer monofilament 3.6 mm line tested originally at 1261 lb. tensile strength failed after 21 days at 650 lb. Another sample of 3.6mm monofilament failed at 800 lb. tension after 22 days. Elongation continued steadily from 10% to 14.1% over 21 days as a result of plastic flow or creep.

Another test determined typical elongation-to-break for a new line is between 25% to 30%. Creep testing for 3.6mm monofilament samples loaded to 31,600 psi, 41,000 psi, and 50,600 psi indicated an average elongation for each load of 7%, 19%, and 33%, respectively. If this continues, the failure would result in 285 days, 107 days and 53 days, respectively.

Another test demonstrated that different diameter spool cylinders contribute to tensile load on the line. Two spool cylinders, with the same capacity, of the same length, hauling at the same load were tested by hauling 45 nautical miles of the same line. The smaller cylinder was 36 inches in outside diameter (OD) and 12 inches inside diameter (ID); the larger cylinder was 40 inches OD and 18 inches ID. Pressure sensitive film was placed about the cylinders prior to reeling. The analysis of the film indicated that the line at the bottom of the larger center cylinder reel was under a pressure of 3015 psi. The pressure at the bottom of the smaller center cylinder reel was 4715 psi.

A corollary to the results of this test is that less depth of monofilament wound on a reel results in a lower total pressure on the line.

Many existing boats with long line reels must continue to replace monofilament every few months. In addition, to replace the storage reel is very expensive. There exists a need for a device that can assist the storage reel in hauling the line.

Therefore, it is an objective of this invention to teach the use of a long line hauling system that will reduce the line pressure on the reels and relieve the stress on the axle.

It is another objective of the invention to teach the provision of a reel structure that reduces deterioration of the fishing line in long line applications.

It is a further objective of the invention to teach the method of making the reels of this invention.

It is a still further objective of this invention to teach the provision of an accessory hauling assembly which reduces the hauling load on the long line reel.

It is yet another objective of the invention to teach the provision of hydraulic circuits for the accessory and the hauling reel to maintain strain without complex controls.

Other objectives and advantages of this invention will become apparent from the following description and drawings wherein are set forth, by way of illustration and example, certain embodiments of the present invention.

DETAILED DESCRIPTION

Figure 1:
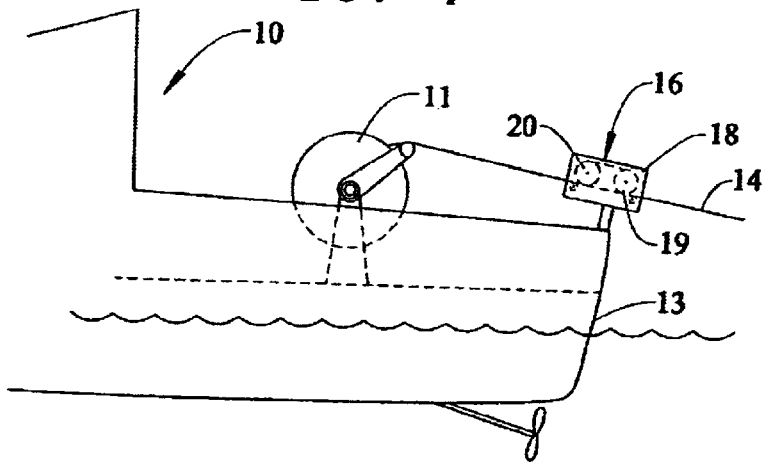
FIG. 1 shows a side view of the stern of a boat with a reel and auxiliary hauler of this invention.
Figure 2:
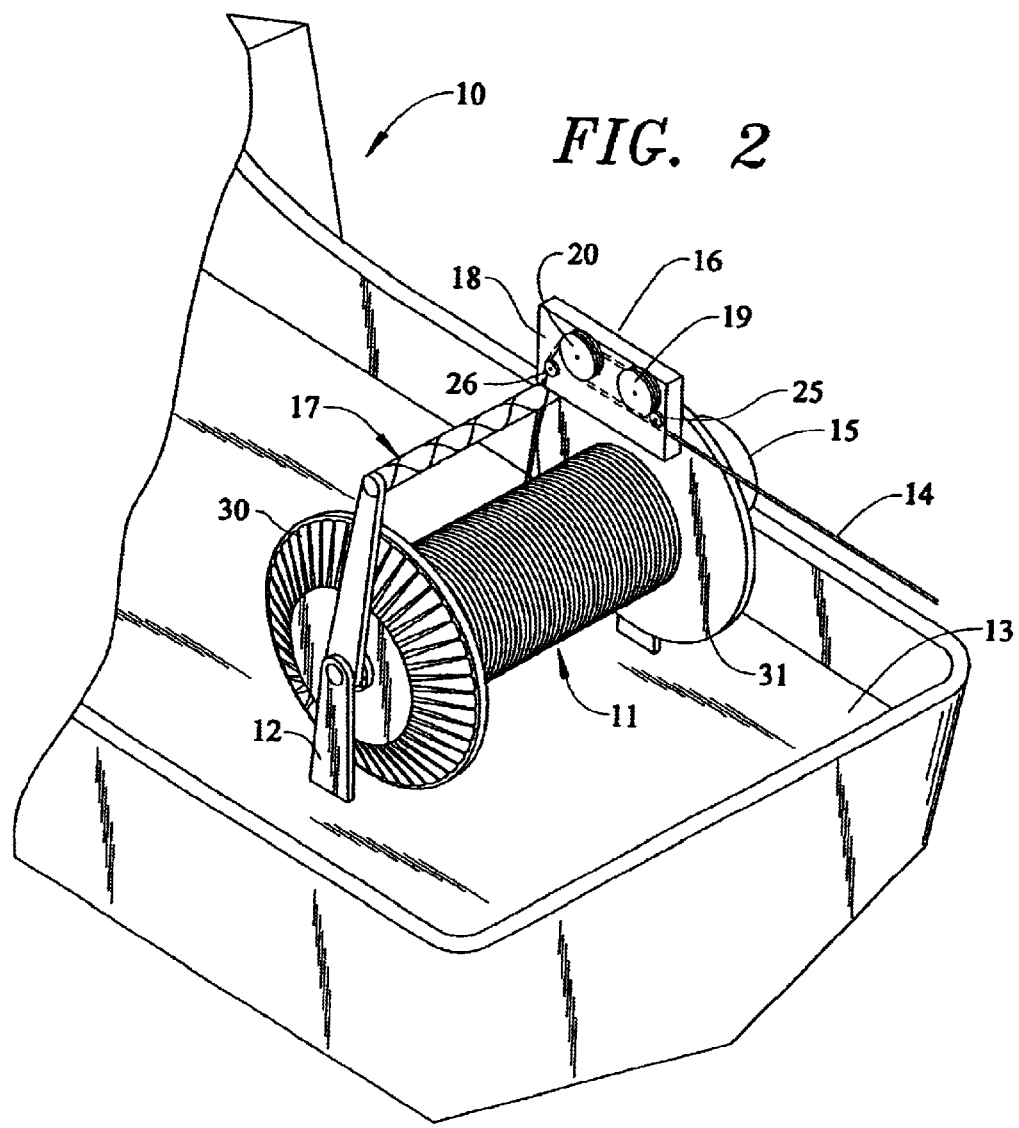
FIG. 2 shows a perspective of the stern of a boat with the auxiliary hauler of this invention mounted on the level wind of a reel.

A boat 10, as shown in FIG. 1 and FIG. 2, engaged in long line fishing has a reel 11 journaled in a bracket 12 mounted on the stern 13. The long line 14, such as a 3.6 mm monofilament, is stored on the reel 11 and is deployed over the stern 13 in a continuous stream which may reach a length of 50 to 100 miles.

The reel 11 is powered a motor 15 which is used for hauling or retrieving the deployed line 14 and to control the pressure on the line in both hauling and deployment. The motor may be hydraulic or electric operating off the boats primary engine or generator or it may have an independent power source.

The auxiliary hauler 16 may be mounted anywhere between the stern 13 of the boat and the reel 11. If the auxiliary hauler 16 is used with an existing reel, it may be mounted independently of the reel 11. Preferably, the auxiliary hauler 16 is incorporated into the level wind 17 which repeatedly traverses the reel to evenly distribute the wraps of line along the length of the reel.

Figure 3:
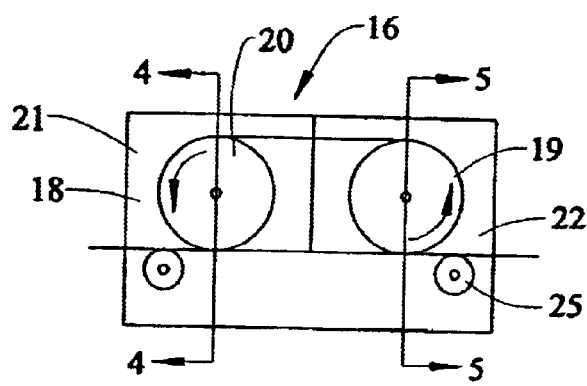
FIG. 3 shows a side view of the auxiliary hauler.
Figure 4:
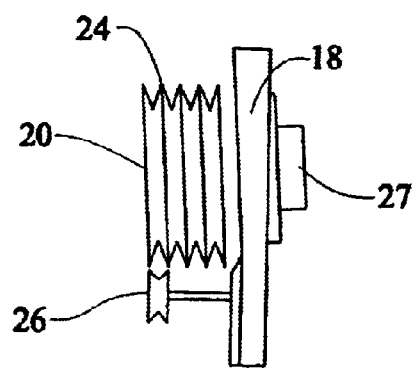
FIG. 4 shows and end view of the auxiliary hauler taken along line 4—4 of FIG. 3.
Figure 5:
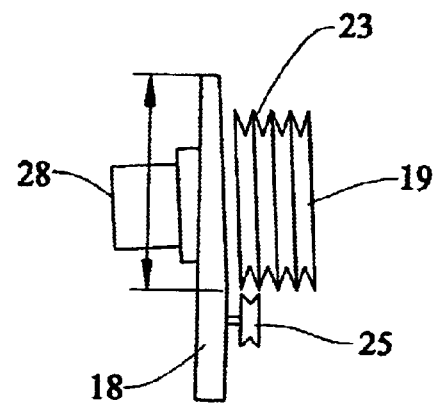
FIG. 5 shows and end view of the auxiliary hauler taken along line 5—5 of FIG. 3.

The auxiliary hauler 16 has a mounting plate 18 with two multi-grooved pulleys, 19 and 20, mounted in-line with the direction of the deployed line, as shown in FIGS. 3, 4, and 5. Each pulley is journaled on a shaft which has one end fixed to the mounting plate 18. The shafts of the respective pulleys are mounted at an angle to each other so that the pulleys do not rotate parallel to each other. As shown, the plate 18 is machined or otherwise formed in such a manner that each pulley is oriented normal to the mounting face 21 and 22 but the face 21 is not parallel with face 22. Of course, the pulleys may be mounted angularly on a planar surface, as an alternative. The angular disposition of the pulleys reduces the natural twist caused by the oval tract followed by the line, as it is hauled, to reduce wear and stress in the line.

Pulleys 19 and 20 have large radius grooves 23 and 24 for frictional contact with the line. As the line comes on-board, it is fed around a guide wheel 25. The guide wheel 25 is positioned on the mounting plate 18 to prevent the line from contracting the edge of the plate and chafing during turns and wave action. The line continues around pulleys 19 and 20 in a repeating parallel wrap and thence over the guide wheel 26 to the reel. As shown, each pulley has four grooves however, more or less wraps may be used. The pulleys may absorb from 25% to 75% of the line pressure.

Each pulley is also powered by a motor, 27 and 28, to assist in hauling the line and reducing the line pressure on the reel. The reel motor 15 and the pulley motors 27, 28 must be coordinated for proper operation of the system. Hydraulic circuits with the two pulley motors in series and the reel motor in parallel provides and efficient circuit without complex controls. The motors may also be powered and coordinated electrically. With the auxiliary hauler accepting half of the pulling load, the stress on the line is reduced to an acceptable level and the stress is relieved on the reel.

To further reduce the wear and tear on the line, the reel 11 may be constructed with a large diameter core 29 and smaller end plates 30, 31. The relationship between the core diameter and the end plate diameter acts as a limit on the amount of monofilament that can be stored on the reel resulting in less pressure existing in the line at the lower wraps. For example, the core diameter is approximately 130×the unstressed diameter of the line and the end plates are approximately 250×the unstressed diameter of the line.

Figure 6:
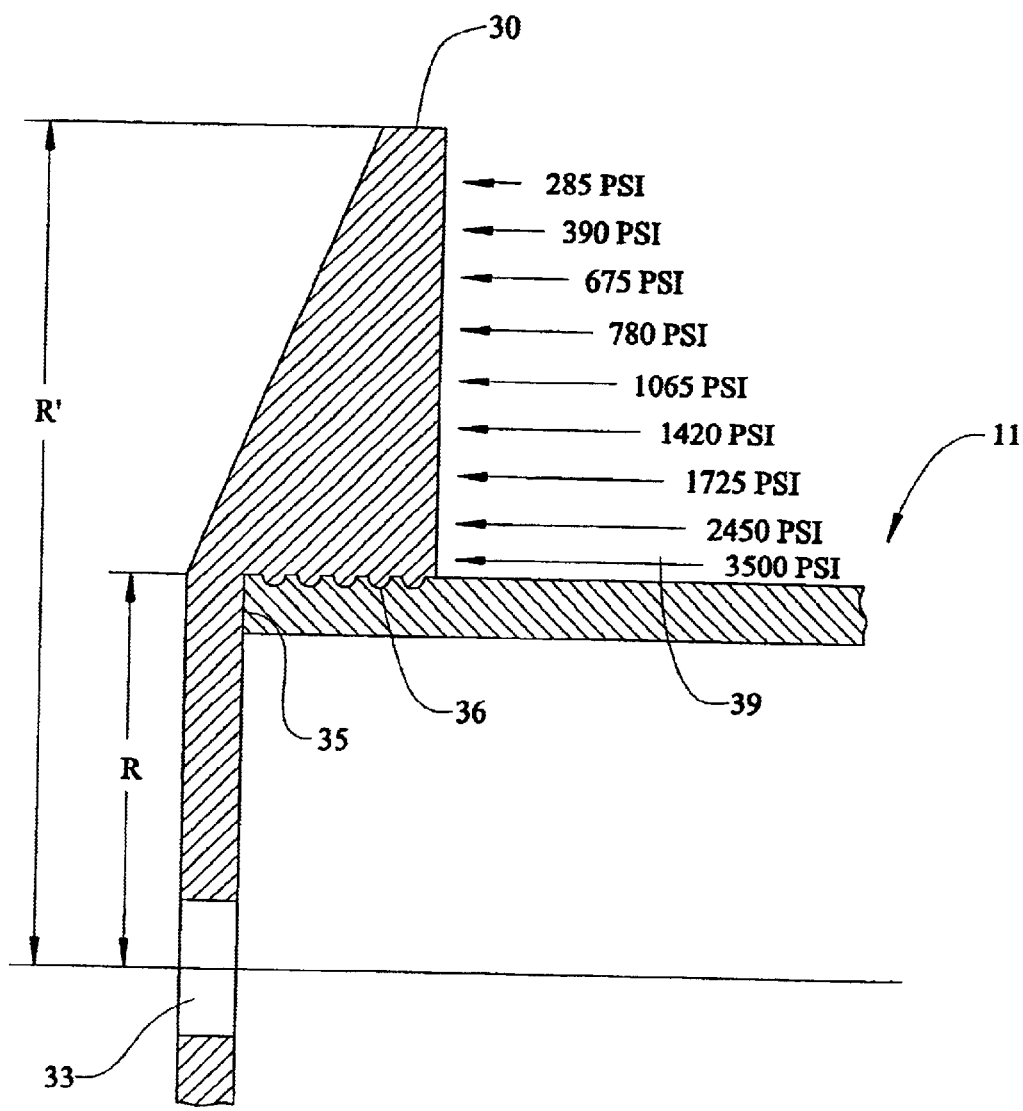
FIG. 6 shows a cross-section of a long line reel with pressures.
Figure 7:
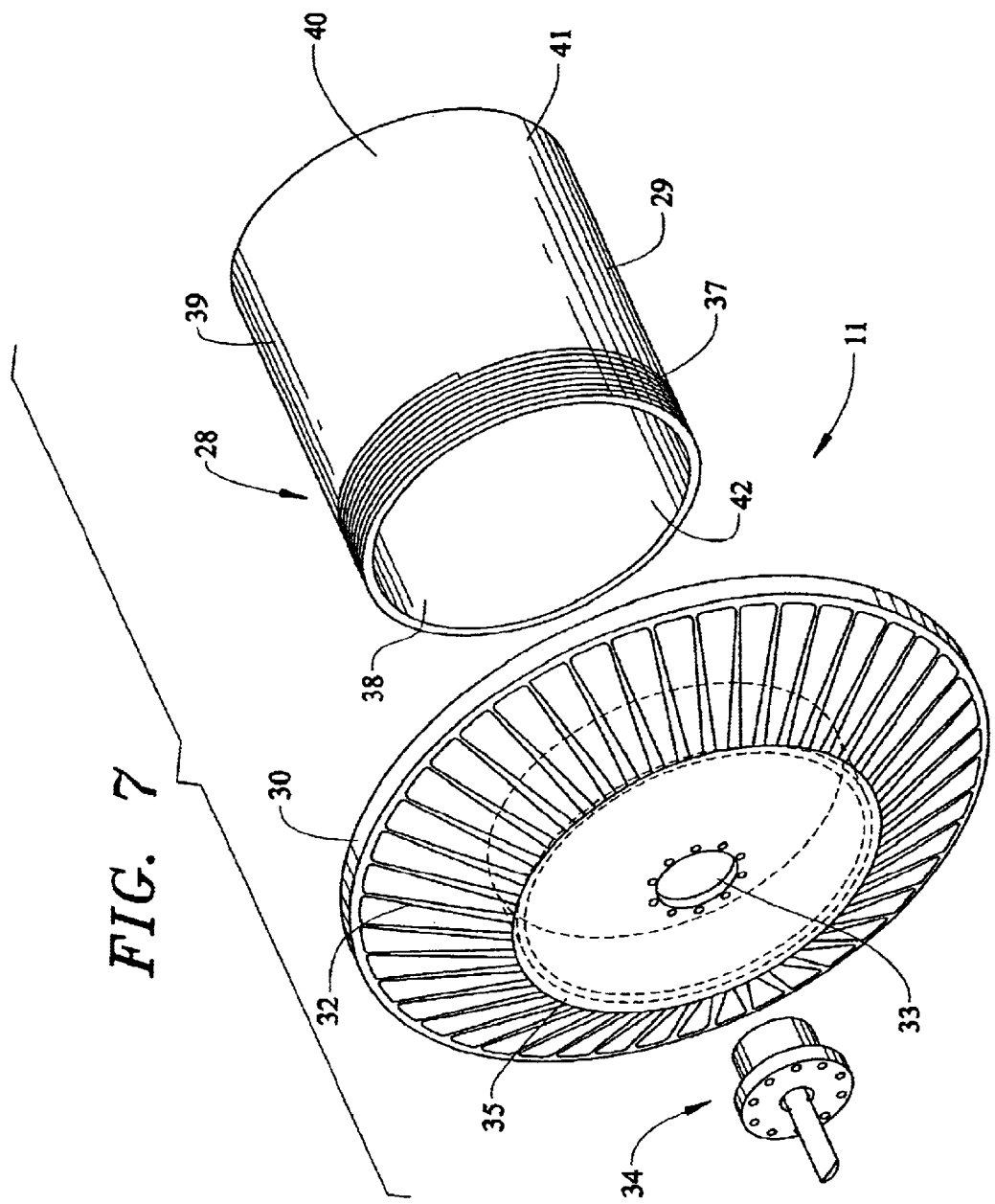
FIG. 7 shows an exploded view of a reel of this invention.

As shown in FIGS. 6 and 7, each end plate of the reel 11 has radial reinforcements 32 and a central aperture 33 for mounting an axle journal 34. The axle is connected to the motor powering the reel. The inner surface of the end plates 30 and 31 have a blind bore 35 which has internal screw threads 36. The core 29 is made up of several sections 38, 39, 40, 41 and 42. These sections have a length defining the length of the reel. Additionally, each section has a portion of the screw thread 37 on each end. The sections are arcuate in the transverse direction totaling 360 degrees and a total diameter equal to the diameter of the blind bore 35. As shown, there are five sections however, there may be more or less.

It should be noted that the smaller center cylinder reel may be constructed from, or be existing, a relatively small reel diameter. In such an instance the smaller center cylinder reel diameter can be changed by use of a spacer such as a shell, clam shell, or the like device capable of modifying the diameter to meet the claims of this invention.

When the sections 38, 39, 40, 41 and 42 are assembled in a column, the end plates are screwed onto the opposite ends of the sections. Obviously, the sections may be assembled with the ends in one end plate and the other end plate turned onto the column. Then both end plates may be tightened to form the reel. The end plates may be fastened together by connectors or they may be held by the end plates, alone.

FIG. 6 is in the nature of a graph depicting the line pressures at different wraps using this reel. Fifty nautical miles of the line was wrapped on the reel at an average pressure of 1600 psi using 1,000 pound test 3.6mm monofilament. As shown, the line pressure varies from about 3500 psi, in the lower wraps, to about 285 psi at the outer wraps. The reel had a core radius R of about 11 inches and an end plate radius R' of 20 inches.

It is to be understood that while a certain form of the invention has been illustrated, it is not to be limited to the specific form or arrangement of parts herein described and shown.

I claim:

1. A long line fishing system having a reel storing fishing line and adapted to engage an independent power source, said reel comprising: an elongated center cylindrical section having a first diameter and a first end plate and a second end plate at each opposite end of said elongated center cylindrical section, said first end plate and said second end plate each having a second diameter, said first diameter being more than one-half of the second diameter wherein said fishing line is a polymeric composition of a certain unstressed diameter, said first diameter being approximately 130×said certain unstressed diameter, and said second diameter being approximately 250×said certain unstressed diameter.

2. The long line fishing system of claim 1 wherein said first end plate and said second end plate each has a central aperture with an axle journal secured thereto.

3. The long line fishing system of claim 2 wherein said first and said second end plate each has reinforcing ribs, said ribs extending radially from each said aperture.

4. The long line fishing system of claim 1 wherein said polymeric composition is a monofilament.

5. The long line fishing system of claim 1 wherein said elongated center cylindrical section first diameter is at least approximately 10 inches in diameter, each said first and second end plate second diameter ranges up to approximately 48 inches in diameter, and the distance between said first and said second end plates ranges from approximately 48 inches to approximately 96 inches.

6. A long line fishing system having a reel for setting and hauling several miles of fishing line, said reel comprising an elongated center cylinder and a first end plate and a second end plate at each end of said elongated center cylinder, said first end plate and said second end plate each having a greater diameter than said center cylinder, said center cylinder composed of a multiplicity of elongated sections extending from said first end plate to said second end plate, each of said elongated sections having a first end, a second end, and an arcuate cross section, each of said first and second ends of each of said multiplicity of arcuate cross sections fixed to said first and second end plates, respectively, a fishing line on said elongated center cylinder, said fishing line having a certain unstressed diameter, the diameter of said elongate center cylinder being approximately 130× said certain diameter, the diameter of each of said first and second end plates being approximately 250× said certain diameter.

7. The long line fishing system of claim 6 wherein each of said first and said second end plates has a central bore, each said bore in said first and said second end plates having a circumference, each of said arcuate cross sections has an arc subtended from said circumference whereby a plurality of said elongated arcuate cross sections forms a second circumference complementary with said circumference.

8. The long line fishing system of claim 7 wherein each said central bore includes an internal screw thread, each of said elongated sections having a matching portion of said screw thread formed on each of said first and second ends whereby said internal screw thread and said portions of said screw thread interengage.

9. A method of making the reel of claim 8 comprising the steps of:

assembling said multiplicity of elongated sections into said elongated center cylinder with said multiplicity of elongated sections forming a continuous circumference and said portions of said screw threads at said first ends and said second ends of said elongated sections forming continuous screw threads, providing a said first end plate and interengaging the continuous screw thread of said first end of said assembled sections with said screw thread in said first end plate, providing a said second end plate and interengaging said continuous screw thread on said second end of said assembled sections with said screw thread in said second end plate.

10. The long line fishing system of claim 6 wherein said elongated center cylinder section is at least approximately 10 inches in diameter, each said first and second end plate ranges up to approximately 48 inches in diameter, and the distance between said first and said second end plates ranges from approximately 48 inches to approximately 96 inches.

* * * * *